Patented Aug. 16, 1949

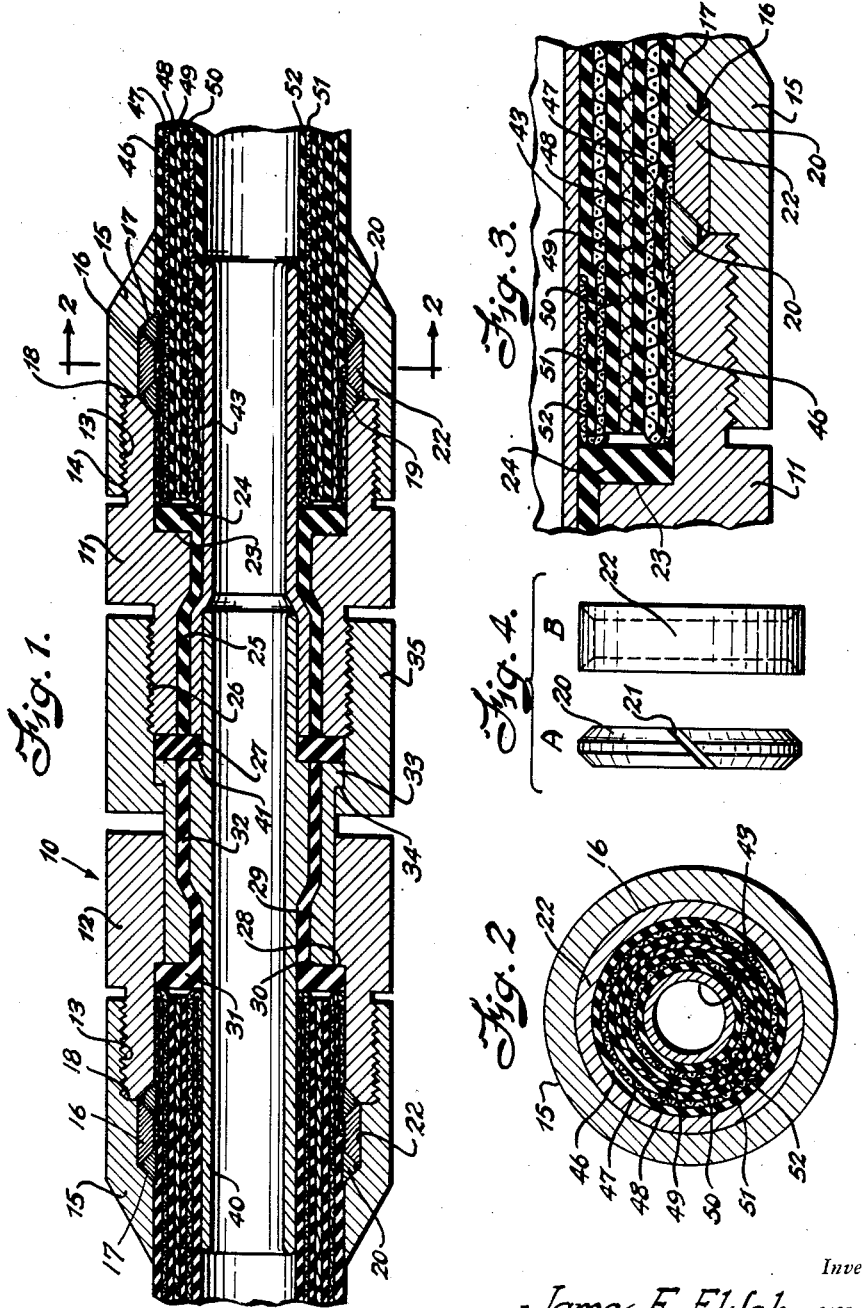

2,479,483

UNITED STATES PATENT OFFICE 2,479,483

CONNECTOR FOR FLEXIBLE CONDUITS

James F. Ekleberry, Miami, Fla., assignor of one-half to C. Roy Miller, Miami, Fla.

Application July 23, 1945, Serial No. 606,569

6 Claims. (Cl. 173—326)

This invention relates to a connector for flexible conduits, and more particularly to a connector for such conduits as divers' hoses adapted to carry a fluid such as air to the diver through a central passageway, as well as serve as a conductor for electric current.

A primary object of this invention is the provision of an improved connector for such conduits which will provide a secure and fluid-tight connection for adjacent sections of the conduit.

Another object is the provision of such a device which will correspondingly provide a reliable and efficient electrical connection for the circuit carried by the conduit.

Still another object is the provision in such a device of means whereby adjacent sections of conduit may be readily and expeditiously detached or attached as desired.

A further object of the invention is the provision of such a connector which will act efficiently with any type of conduit having electrical wiring associated therewith.

Still other objects reside in the combinations of elements, arrangements of parts, features of construction, all as will be more fully pointed out hereinafter and disclosed in the accompanying drawing wherein there is shown a preferred form of this inventive concept.

In the drawings:

Figure 1 is a longitudinal sectional view taken along the center line of the connector and showing a section of flexible conduit in association therewith.

Figure 2 is a sectional view taken substantially along the line 2—2 of Figure 1.

Figure 3 is an enlarged sectional detail view of certain constructional elements, and Figure 4 is an end elevational view of certain other constructural elements.

Similar reference characters refer to similar parts throughout the several views of the drawings.

The device of the instant invention generally indicated at 10 is comprised of two sleeves 11 and 12 adapted to be secured in related assembly, in a manner to be more fully described hereinafter. Each of sleeves 11 and 12 terminates at its outer extremity in an identical threaded flange 13, adapted to be engaged by corresponding threads 14 carried interiorly of a locking collar 15. Each of locking collars 15 is provided with an interior recess 16, bevelled at one extremity as at 17, and terminating at the other extremity in a shoulder 18 adapted to abut the extremity of flange 13, it being pointed out that such extremity is chamfered as at 19 to provide an opposite bevelled extremity for the interior annular recess 16. Positioned within annular recess 16 are a pair of bevelled compression rings 20 split as at 21 (see Figure 4), between which is a compression sleeve 22 interiorly chamfered to conform to one of the bevelled sides of the associated compression rings 18. The opposite bevelled sides of the rings 20 are adapted to engage respectively with the chamfered portion of the sleeve 13 and the chamfered extremity 17 of the recess 16. Thus it will be seen that as the collar 15 is threaded on the flange 13, the longitudinal extent of the recess 16 will be finished and bevelled or chamfered edges of the members 22 and 20 coacting with the chamfered extremities of the recess will cause the compression rings to move inwardly for a purpose to be more fully described hereinafter.

Referring specifically to collar 11 same is provided with an interiorly disposed shoulder 23 against which a flange 24 comprising a portion of an insulating sleeve 25 is adapted to seat. The sleeve 25 extends the full length of the collar 11 which terminates in a threaded flange 26, the extremity of which, together with the extremity of sleeve 25, seats against a rubber gasket 27.

Having particular reference to the collar 12 the same is also provided with a shoulder 28, and is secured as by welding or the like to a metal insulation retainer 29, the extremity 30 of which together with the shoulder 28 forms a seat for the flange 31 of an insulating sleeve 32 substantially identical to the sleeve 25. The extremity of retainer 29 and sleeve 32 seat in abutting relationship against the gasket 27. The extremity of retainer 29 adjacent the gasket 27 forms a shoulder 33 against which a shoulder 34 of an interiorly threaded lock nut 35 is adapted to abut. The threads of the nut 35 are adapted to engage the threads 26 of the member 11.

Thus it will be seen that in order to connect or disconnect the device, it is merely necessary to thread or unthread the nut 35 to disengage the collars 11 and 12, thus affording a relatively quick and simple means of connecting and disconnecting the device. It will also be seen that the collars 11 and 12, the retainer 29 and the nut 35 which, it is to be pointed out, are comprised of suitable conductive metal, form a substantially continuous electrical conductor, while the shoulders 24 and 31 of the sleeves 25 and 32 together with the washer 27 form an interior layer of insulating material for a purpose to be more fully described hereinafter.

Interiorly of the collar 12 and extending to a point substantially adjacent the end of its associated member 15, but spaced therefrom by insulating sleeve 32 is a sleeve 40 preferably of copper of similar conductive material and provided with a shoulder 41 adapted to seat against gasket 27. The extremity of member 40 beyond the shoulder 41 forms a male portion of an electrical connection, the opposite portion of which comprises a corresponding female connector 43 one extremity of which seats against the side of the gasket 27 opposite the shoulder 41, and the opposite extremity of which extends to a point substantially adjacent the extremity of the collar 15 associated with the collar 11.

The connector comprising the instant invention is adapted to be utilized with any suitable type of conduit including separate conductors having insulating material therebetween, the arrangement being such that one conductor is placed in electrical association with the members 40 and 43, and the other conductor in association with the collars 11 and 12, the insulation above described serving to maintain the insulating medium through the connection. The conduit shown is composed of an outer layer 46 preferably of fabric such as cotton, surrounding a layer 47 of woven metallic braid, which in turn surrounds a rubber insulating layer 48, a cotton fabric layer 49, an inner rubber insulating layer 50 and a second layer of metallic braid 51. The interior of the conduit is comprised of an inner layer 52 of cotton fabric similar to the outer layer 46.

As best shown in Figure 3, when the conduit above described is utilized in association with the coupling of the instant invention, the insulating rubber and fabric layers are cut back a material distance from the extremities of the fabric layers. The extremity of the metallic mesh or braid conductor 51 is then folded inwardly back over the layer 52, and the extremity of the metallic layer 47 is folded outwardly back out over the layer 46. The end of the cable is then inserted between, illustratively, the copper sleeve 43 and the collar 11 and its associated locking collar 15 with its interiorly positioned compression rings and sleeve until the extremities of the metallic layer abut the insulating flange 24. Rotation of the collar 15 then causes the above described coaction of the compressor sleeve 22 and its associated compression rings 20 within the recess 16 causing the compression rings 20 to bite into the cable and hold the same securely in related assembly with the collar 11. Obviously, the same procedure is carried out in connection with the collar 12.

Thus it will be seen that there is insured an effective electrical connection between the inner layers 51 of the opposite sections of cable through the sleeves 40 and 43, and a correspondingly efficient connection between the outer layers 47 through the collars 11 and 12 and the nut 26 and the insulation retainer 29. It will also be seen that the previously described insulating sleeves 26 and 32 together with the gasket 27 completely preclude the possibility of short circuiting through the coupling. It will also be seen that the associated sections of the conduit may be readily and easily detached as desired.

From the foregoing it will be seen that there is herein provided an improved connector accomplishing all the objects of this device and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A connector for flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit sections having concentric inner and outer electrically conductive layers, said inner and outer layers being respectively connected to said inner and outer conductors and packing and sealing means for securing said ends within said chambers.

2. A connector for flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit sections having concentric inner and outer electrically conductive layers, said inner and outer layers being respectively connected to said inner and outer conductors and packing and sealing means for securing said ends within said chambers, said tubular sleeves being internally shouldered intermediate their ends, said insulating sleeves having surfaces engaging said shoulders and portions interlocked within said tubular sleeves to prevent relative movement therein.

3. A connector for flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit sections having concentric inner and outer electrically conductive layers, said inner and outer layers being respectively connected to said inner and outer conductors and packing and sealing means for securing said ends within said chambers, said tubular sleeves being internally shouldered intermediate their ends, said insulating sleeves having surfaces engaging said shoulders and portions interlocked within said tubular sleeves to prevent relative movement therein, said telescoping bushings having portions of enlarged diameter engaging said interlocking portions of said insulating sleeves.

4. A connector for flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit actions having concentric inner and outer electrically conductive layers, said inner and outer layers being respectively connected to said inner and outer conductors and packing and sealing means for securing said ends within said chambers, said tubular sleeves being internally shouldered intermediate their ends, said insulating sleeves having surfaces engaging said shoulders and portions interlocked within said tubular sleeves to prevent relative movement therein and a deformable insulating seal between the ends of said insulating sleeves.

5. A connector for flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit sections having concentric inner and outer electrically conductive layers, said inner and outer layers being respectively connected to said inner and outer conductors and packing and sealing means for securing said ends within said chambers, said coupling means including a flanged sleeve extending from one of said tubular sleeves and surrounding the insulating sleeve carried therein, an externally threaded extension carried by the other of said tubular sleeves and surrounding the insulating sleeve therein, and a gland on said flanged sleeve and internally threaded for engaging said threaded extension.

6. A connector for divers' flexible hoses having a central air passage and concentric electric conductors thereabout comprising a pair of tubular electrically conductive sleeves, constituting an outer conductor, coupling means detachably uniting said sleeves, telescoping electrically conductive bushings in said tubular sleeves constituting an inner conductor, an insulating sleeve interposed between each of said tubular sleeves and said conductive bushing therein, said inner and outer conductors providing annular chambers therebetween accommodating opposed ends of air conduit sections having concentric inner and outer electrically conductive layers, said inner and outer layers being respectively connected to said inner and outer conductors and packing and sealing means for securing said ends within said chambers including radially disposed electrically conductive means for electrically engaging and retaining the outer conductive layer of said conduit and longitudinally compressive means for urging said conduit inwardly of said tubular sleeve.

JAMES F. EKLEBERRY.

REFERENCES CITED

The following references are of record in the file of this patent:

UNITED STATES PATENTS

| Number | Name | Date |
| --- | --- | --- |
| 409,181 | De Ferranti | Aug. 20, 1889 |
| 425,283 | Wright | Apr. 8, 1890 |
| 825,480 | Paterson et al. | July 10, 1906 |
| 1,726,957 | Hughes | Sept. 3, 1929 |
| 2,033,559 | Warr | Mar. 10, 1936 |
| 2,057,242 | Mautsch | Oct. 13, 1936 |
| 2,247,416 | Sands et al. | July 1, 1941 |
| 2,365,747 | Cowles | Dec. 26, 1944 |
| 2,383,010 | Miller | Aug. 21, 1945 |
| 2,425,834 | Salisbury | Aug. 19, 1947 |

FOREIGN PATENTS

| Number | Country | Date |
| --- | --- | --- |
| 350,074 | France | June 11, 1931 |
| 546,306 | Great Britain | July 7, 1942 |